(12) United States Patent
Yamasaki et al.

(10) Patent No.: US 9,847,835 B2
(45) Date of Patent: Dec. 19, 2017

(54) LIGHTING DEVICE AND LIGHTING SYSTEM

(71) Applicant: Panasonic Intellectual Property Management Co., Ltd., Osaka (JP)

(72) Inventors: Shigeaki Yamasaki, Osaka (JP); Yoshihiko Matsukawa, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 66 days.

(21) Appl. No.: 15/041,545

(22) Filed: Feb. 11, 2016

(65) Prior Publication Data

US 2016/0261342 A1  Sep. 8, 2016

(30) Foreign Application Priority Data

Mar. 6, 2015 (JP) .................................. 2015-045008

(51) Int. Cl.
    *H04B 10/116* (2013.01)
(52) U.S. Cl.
    CPC .................................. *H04B 10/116* (2013.01)
(58) Field of Classification Search
    CPC .......................................... H04B 10/11–10/116
    USPC ......................................... 398/118–131, 172
    See application file for complete search history.

(56) References Cited

U.S. PATENT DOCUMENTS

| 8,823,852 B2 | 9/2014 | Yamada et al. |
| 8,908,074 B2 | 12/2014 | Oshima et al. |
| 8,913,144 B2 | 12/2014 | Oshima et al. |
| 8,922,666 B2 | 12/2014 | Oshima et al. |
| 8,965,216 B2 | 2/2015 | Oshima et al. |
| 8,988,574 B2 | 3/2015 | Oshima et al. |
| 8,994,841 B2 | 3/2015 | Oshima et al. |
| 8,994,865 B2 | 3/2015 | Oshima et al. |

(Continued)

FOREIGN PATENT DOCUMENTS

| JP | 3291451 B | 3/2002 |
| JP | 2008-252466 A | 10/2008 |

(Continued)

OTHER PUBLICATIONS

"JEITA CP-1223 Visible Light Beacon System", AV & IT Standardization Committee, May 2013, with partial English translation.

*Primary Examiner* — Li Liu

(74) *Attorney, Agent, or Firm* — Renner, Otto, Boisselle & Sklar, LLP

(57) ABSTRACT

A Lighting device, which performs visible light communication with a receiver including an image sensor, includes: a dividing unit that divides identification information assigned to the lighting device into N packets (where N is a natural number greater than or equal to 2); a block generator that generates signal blocks each of which includes M packets (where M is a natural number greater than or equal to N) that include at least one of each of the N packets; and a light source that sequentially transmits the signal blocks in (i) each frame cycle of the image sensor or in (ii) each cycle substantially equal to an integral multiple of the frame cycle, by superimposing each of the signal blocks onto illumination light. The block generator generates the signal blocks so that an order of arranging the M packets is different between consecutive signal blocks in the signal blocks.

10 Claims, 18 Drawing Sheets

(56) References Cited

U.S. PATENT DOCUMENTS

| | | | |
|---|---|---|---|
| 9,008,352 B2 | 4/2015 | Oshima et al. | |
| 9,019,412 B2 | 4/2015 | Oshima et al. | |
| 9,030,585 B2 | 5/2015 | Oshima et al. | |
| 9,083,543 B2 | 7/2015 | Oshima et al. | |
| 9,083,544 B2 | 7/2015 | Oshima et al. | |
| 9,085,927 B2 | 7/2015 | Oshima et al. | |
| 9,087,349 B2 | 7/2015 | Oshima et al. | |
| 9,088,360 B2 | 7/2015 | Oshima et al. | |
| 9,088,362 B2 | 7/2015 | Oshima et al. | |
| 9,088,363 B2 | 7/2015 | Oshima et al. | |
| 9,094,120 B2 | 7/2015 | Oshima et al. | |
| 9,143,339 B2 | 9/2015 | Oshima et al. | |
| 9,166,810 B2 | 10/2015 | Oshima et al. | |
| 9,184,838 B2 | 11/2015 | Oshima et al. | |
| 2009/0073952 A1* | 3/2009 | Shin | H04B 10/1149 370/345 |
| 2009/0252231 A1* | 10/2009 | Tahara | H04N 21/23602 375/240.23 |
| 2010/0246662 A1* | 9/2010 | Koto | H04N 21/8547 375/240.1 |
| 2012/0154443 A1 | 6/2012 | Matsui et al. | |
| 2012/0281987 A1* | 11/2012 | Schenk | H05B 37/029 398/118 |
| 2013/0234607 A1* | 9/2013 | Kim | H05B 33/0854 315/158 |
| 2013/0335592 A1 | 12/2013 | Yamada et al. | |
| 2014/0045549 A1* | 2/2014 | Ryan | H04N 5/3532 455/556.1 |
| 2014/0184914 A1 | 7/2014 | Oshima et al. | |
| 2014/0186048 A1 | 7/2014 | Oshima et al. | |
| 2014/0192226 A1 | 7/2014 | Oshima et al. | |
| 2014/0204129 A1 | 7/2014 | Oshima et al. | |
| 2014/0205136 A1 | 7/2014 | Oshima et al. | |
| 2014/0232896 A1 | 8/2014 | Oshima et al. | |
| 2014/0232903 A1 | 8/2014 | Oshima et al. | |
| 2014/0286644 A1 | 9/2014 | Oshima et al. | |
| 2014/0294398 A1 | 10/2014 | Oshima et al. | |
| 2014/0186052 A1 | 12/2014 | Oshima et al. | |
| 2014/0186055 A1 | 12/2014 | Oshima et al. | |
| 2014/0307157 A1 | 12/2014 | Oshima et al. | |
| 2014/0212146 A1 | 2/2015 | Oshima et al. | |
| 2015/0050027 A1 | 2/2015 | Oshima et al. | |
| 2014/0186047 A1 | 3/2015 | Oshima et al. | |
| 2014/0186049 A1 | 3/2015 | Oshima et al. | |
| 2014/0376922 A1 | 3/2015 | Oshima et al. | |
| 2014/0185860 A1 | 4/2015 | Oshima et al. | |
| 2014/0307155 A1 | 4/2015 | Oshima et al. | |
| 2015/0093107 A1* | 4/2015 | Jovicic | H04B 10/116 398/25 |
| 2014/0307156 A1 | 5/2015 | Oshima et al. | |
| 2015/0155939 A1 | 6/2015 | Oshima et al. | |
| 2013/0337787 A1 | 7/2015 | Oshima et al. | |
| 2014/0037296 A1 | 7/2015 | Oshima et al. | |
| 2014/0186026 A1 | 7/2015 | Oshima et al. | |
| 2014/0186050 A1 | 7/2015 | Oshima et al. | |
| 2014/0207517 A1 | 7/2015 | Oshima et al. | |
| 2014/0212145 A1 | 7/2015 | Oshima et al. | |
| 2014/0290138 A1 | 7/2015 | Oshima et al. | |
| 2014/0294397 A1 | 7/2015 | Oshima et al. | |
| 2015/0188632 A1 | 7/2015 | Aoyama et al. | |
| 2015/0222355 A1 | 8/2015 | Ueki et al. | |
| 2015/0223277 A1* | 8/2015 | Jovicic | H04B 10/116 455/41.2 |
| 2015/0229393 A1 | 8/2015 | Oshima et al. | |
| 2015/0244914 A1 | 8/2015 | Oshima et al. | |
| 2015/0244919 A1 | 8/2015 | Oshima et al. | |
| 2014/0192185 A1 | 9/2015 | Oshima et al. | |
| 2013/0330088 A1 | 10/2015 | Oshima et al. | |
| 2015/0070522 A1 | 11/2015 | Oshima et al. | |
| 2015/0341539 A1 | 11/2015 | Oshima et al. | |
| 2015/0372753 A1* | 12/2015 | Jovicic | H04B 10/116 398/172 |
| 2015/0373503 A1* | 12/2015 | Jovicic | G01S 5/0252 455/456.1 |
| 2016/0315702 A1* | 10/2016 | Roberts | H04B 10/5563 |
| 2016/0323035 A1* | 11/2016 | Jovicic | H04B 10/0795 |
| 2017/0063455 A1* | 3/2017 | Muguruma | H04B 10/116 |

FOREIGN PATENT DOCUMENTS

| | | |
|---|---|---|
| JP | 4636312 B | 12/2010 |
| JP | 2014-127742 A | 7/2014 |
| JP | 5590431 B1 | 8/2014 |
| JP | 5619140 B2 | 9/2014 |
| WO | WO 2012/023253 A1 | 2/2012 |
| WO | WO 2014/103341 A | 7/2014 |

* cited by examiner

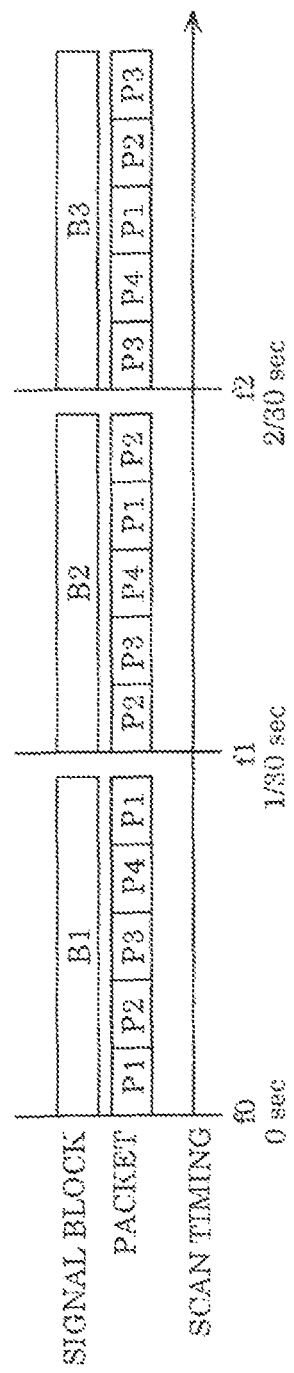

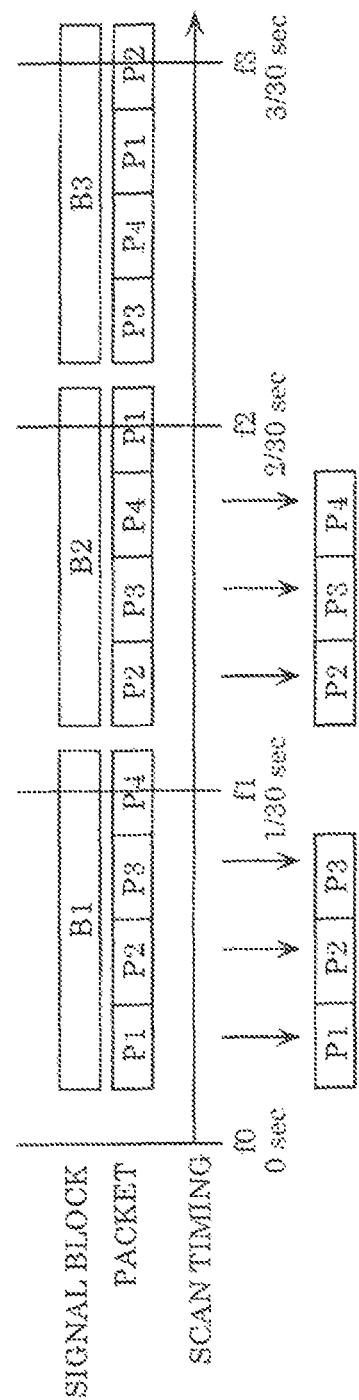

FIG. 9
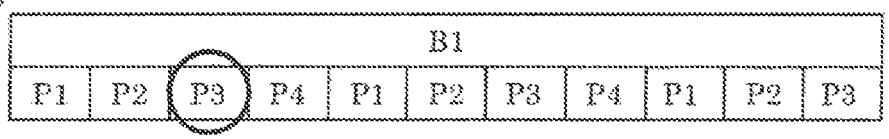
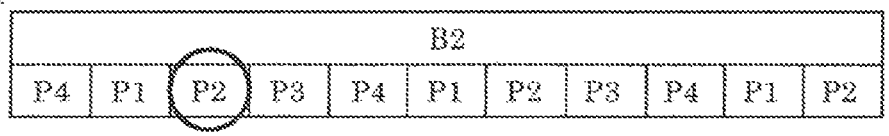
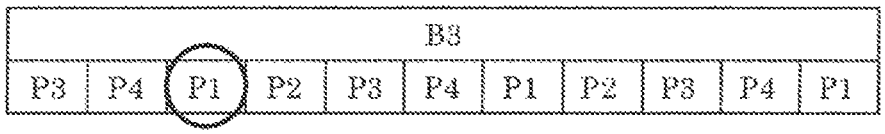
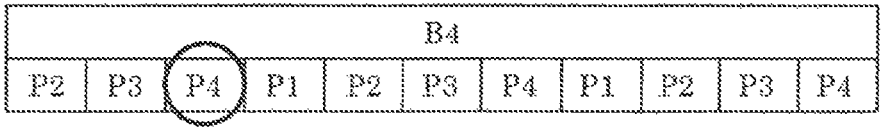

FIG. 10

| B1 | P1 | P2 | P1 |
| B2 | P2 | P1 | P2 |

FIG. 11A

| B1 | P1 | P2 | P3 | P1 |
| B2 | P2 | P3 | P1 | P2 |
| B3 | P3 | P1 | P2 | P3 |

FIG. 11B

| B1 | P1 | P2 | P3 | P1 | P2 |
| B2 | P3 | P1 | P2 | P3 | P1 |
| B3 | P2 | P3 | P1 | P2 | P3 |

FIG. 11C

| B1 | P1 | P2 | P3 | P1 | P2 | P3 | P1 |
| B2 | P2 | P3 | P1 | P2 | P3 | P1 | P2 |
| B3 | P3 | P1 | P2 | P3 | P1 | P2 | P3 |

FIG. 12A

|    |    |    |    |    |    |
|----|----|----|----|----|----|
| B1 | P1 | P2 | P3 | P4 | P1 |
| B2 | P2 | P3 | P4 | P1 | P2 |
| B3 | P3 | P4 | P1 | P2 | P3 |
| B4 | P4 | P1 | P2 | P3 | P4 |

FIG. 12B

|    |    |    |    |    |    |    |
|----|----|----|----|----|----|----|
| B1 | P1 | P2 | P3 | P4 | P1 | P2 |
| B2 | P3 | P4 | P1 | P2 | P3 | P4 |
| B3 | P1 | P2 | P3 | P4 | P1 | P2 |
| B4 | P3 | P4 | P1 | P2 | P3 | P4 |

FIG. 12C

|    |    |    |    |    |    |    |
|----|----|----|----|----|----|----|
| B1 | P1 | P2 | P3 | P4 | P1 | P2 |
| B2 | P3 | P4 | P1 | P2 | P3 | P4 |
| B3 | P2 | P3 | P4 | P1 | P2 | P3 |
| B4 | P4 | P1 | P2 | P3 | P4 | P1 |

FIG. 12D

|    |    |    |    |    |    |    |    |
|----|----|----|----|----|----|----|----|
| B1 | P1 | P2 | P3 | P4 | P1 | P2 | P3 |
| B2 | P4 | P1 | P2 | P3 | P4 | P1 | P2 |
| B3 | P3 | P4 | P1 | P2 | P3 | P4 | P1 |
| B4 | P2 | P3 | P4 | P1 | P2 | P3 | P4 |

FIG. 13A

|    | 1  | 2  | 3  | 4  | 5  | 6  |
|----|----|----|----|----|----|----|
| B1 | P1 | P2 | P3 | P4 | P5 | P1 |
| B2 | P2 | P3 | P4 | P5 | P1 | P2 |
| B3 | P3 | P4 | P5 | P1 | P2 | P3 |
| B4 | P4 | P5 | P1 | P2 | P3 | P4 |
| B5 | P5 | P1 | P2 | P3 | P4 | P5 |

FIG. 13B

|    |    |    |    |    |    |    |    |
|----|----|----|----|----|----|----|----|
| B1 | P1 | P2 | P3 | P4 | P5 | P1 | P2 |
| B2 | P3 | P4 | P5 | P1 | P2 | P3 | P4 |
| B3 | P5 | P1 | P2 | P3 | P4 | P5 | P1 |
| B4 | P2 | P3 | P4 | P5 | P1 | P2 | P3 |
| B5 | P4 | P5 | P1 | P2 | P3 | P4 | P5 |

FIG. 13C

|    |    |    |    |    |    |    |    |    |
|----|----|----|----|----|----|----|----|----|
| B1 | P1 | P2 | P3 | P4 | P5 | P1 | P2 | P3 |
| B2 | P4 | P5 | P1 | P2 | P3 | P4 | P5 | P1 |
| B3 | P2 | P3 | P4 | P5 | P1 | P2 | P3 | P4 |
| B4 | P5 | P1 | P2 | P3 | P4 | P5 | P1 | P2 |
| B5 | P3 | P4 | P5 | P1 | P2 | P3 | P4 | P5 |

FIG. 13D

|    |    |    |    |    |    |    |    |    |    |
|----|----|----|----|----|----|----|----|----|----|
| B1 | P1 | P2 | P3 | P4 | P5 | P1 | P2 | P3 | P4 |
| B2 | P5 | P1 | P2 | P3 | P4 | P5 | P1 | P2 | P3 |
| B3 | P4 | P5 | P1 | P2 | P3 | P4 | P5 | P1 | P2 |
| B4 | P3 | P4 | P5 | P1 | P2 | P3 | P4 | P5 | P1 |
| B5 | P2 | P3 | P4 | P5 | P1 | P2 | P3 | P4 | P5 |

FIG. 14A

|    |    |    |    |    |    |    |    |
|----|----|----|----|----|----|----|----|
| B1 | P1 | P2 | P3 | P4 | P5 | P6 | P1 |
| B2 | P2 | P3 | P4 | P5 | P6 | P1 | P2 |
| B3 | P3 | P4 | P5 | P6 | P1 | P2 | P3 |
| B4 | P4 | P5 | P6 | P1 | P2 | P3 | P4 |
| B5 | P5 | P6 | P1 | P2 | P3 | P4 | P5 |
| B6 | P6 | P1 | P2 | P3 | P4 | P5 | P6 |

FIG. 14B

|    |    |    |    |    |    |    |    |    |
|----|----|----|----|----|----|----|----|----|
| B1 | P1 | P2 | P3 | P4 | P5 | P6 | P1 | P2 |
| B2 | P3 | P4 | P5 | P6 | P1 | P2 | P3 | P4 |
| B3 | P5 | P6 | P1 | P2 | P3 | P4 | P5 | P6 |
| B4 | P1 | P2 | P3 | P4 | P5 | P6 | P1 | P2 |
| B5 | P3 | P4 | P5 | P6 | P1 | P2 | P3 | P4 |
| B6 | P5 | P6 | P1 | P2 | P3 | P4 | P5 | P6 |

FIG. 14C

|    |    |    |    |    |    |    |    |    |
|----|----|----|----|----|----|----|----|----|
| B1 | P1 | P2 | P3 | P4 | P5 | P6 | P1 | P2 | P3 |
| B2 | P4 | P5 | P6 | P1 | P2 | P3 | P4 | P5 | P6 |
| B3 | P1 | P2 | P3 | P4 | P5 | P6 | P1 | P2 | P3 |
| B4 | P4 | P5 | P6 | P1 | P2 | P3 | P4 | P5 | P6 |
| B5 | P1 | P2 | P3 | P4 | P5 | P6 | P1 | P2 | P3 |
| B6 | P4 | P5 | P6 | P1 | P2 | P3 | P4 | P5 | P6 |

FIG. 14D

|    |    |    |    |    |    |    |    |    |    |    |
|----|----|----|----|----|----|----|----|----|----|----|
| B1 | P1 | P2 | P3 | P4 | P5 | P6 | P1 | P2 | P3 | P4 |
| B2 | P5 | P6 | P1 | P2 | P3 | P4 | P5 | P6 | P1 | P2 |
| B3 | P3 | P4 | P5 | P6 | P1 | P2 | P3 | P4 | P5 | P6 |
| B4 | P1 | P2 | P3 | P4 | P5 | P6 | P1 | P2 | P3 | P4 |
| B5 | P5 | P6 | P1 | P2 | P3 | P4 | P5 | P6 | P1 | P2 |
| B6 | P3 | P4 | P5 | P6 | P1 | P2 | P3 | P4 | P5 | P6 |

FIG. 14E

|    |    |    |    |    |    |    |    |    |    |    |
|----|----|----|----|----|----|----|----|----|----|----|
| B1 | P1 | P2 | P3 | P4 | P5 | P6 | P1 | P2 | P3 | P4 | P5 |
| B2 | P6 | P1 | P2 | P3 | P4 | P5 | P6 | P1 | P2 | P3 | P4 |
| B3 | P5 | P6 | P1 | P2 | P3 | P4 | P5 | P6 | P1 | P2 | P3 |
| B4 | P4 | P5 | P6 | P1 | P2 | P3 | P4 | P5 | P6 | P1 | P2 |
| B5 | P3 | P4 | P5 | P6 | P1 | P2 | P3 | P4 | P5 | P6 | P1 |
| B6 | P2 | P3 | P4 | P5 | P6 | P1 | P2 | P3 | P4 | P5 | P6 |

FIG. 15A

|    | 1  | 2  | 3  | 4  | 5  | 6  | 7  | 8  |
|----|----|----|----|----|----|----|----|----|
| B1 | P1 | P2 | P3 | P4 | P5 | P6 | P7 | P1 |
| B2 | P2 | P3 | P4 | P5 | P6 | P7 | P1 | P2 |
| B3 | P3 | P4 | P5 | P6 | P7 | P1 | P2 | P3 |
| B4 | P4 | P5 | P6 | P7 | P1 | P2 | P3 | P4 |
| B5 | P5 | P6 | P7 | P1 | P2 | P3 | P4 | P5 |
| B6 | P6 | P7 | P1 | P2 | P3 | P4 | P5 | P6 |
| B7 | P7 | P1 | P2 | P3 | P4 | P5 | P6 | P7 |

FIG. 15B

|    |    |    |    |    |    |    |    |    |    |
|----|----|----|----|----|----|----|----|----|----|
| B1 | P1 | P2 | P3 | P4 | P5 | P6 | P7 | P1 | P2 |
| B2 | P3 | P4 | P5 | P6 | P7 | P1 | P2 | P3 | P4 |
| B3 | P5 | P6 | P7 | P1 | P2 | P3 | P4 | P5 | P6 |
| B4 | P7 | P1 | P2 | P3 | P4 | P5 | P6 | P7 | P1 |
| B5 | P2 | P3 | P4 | P5 | P6 | P7 | P1 | P2 | P3 |
| B6 | P4 | P5 | P6 | P7 | P1 | P2 | P3 | P4 | P5 |
| B7 | P6 | P7 | P1 | P2 | P3 | P4 | P5 | P6 | P7 |

FIG. 15C

|    |    |    |    |    |    |    |    |    |    |
|----|----|----|----|----|----|----|----|----|----|
| B1 | P1 | P2 | P3 | P4 | P5 | P6 | P7 | P1 | P2 | P3 |
| B2 | P4 | P5 | P6 | P7 | P1 | P2 | P3 | P4 | P5 | P6 |
| B3 | P7 | P1 | P2 | P3 | P4 | P5 | P6 | P7 | P1 | P2 |
| B4 | P3 | P4 | P5 | P6 | P7 | P1 | P2 | P3 | P4 | P5 |
| B5 | P6 | P7 | P1 | P2 | P3 | P4 | P5 | P6 | P7 | P1 |
| B6 | P2 | P3 | P4 | P5 | P6 | P7 | P1 | P2 | P3 | P4 |
| B7 | P5 | P6 | P7 | P1 | P2 | P3 | P4 | P5 | P6 | P7 |

FIG. 15D

| | | | | | | | | | | |
|---|---|---|---|---|---|---|---|---|---|---|
| B1 | P1 | P2 | P3 | P4 | P5 | P6 | P7 | P1 | P2 | P3 | P4 |
| B2 | P5 | P6 | P7 | P1 | P2 | P3 | P4 | P5 | P6 | P7 | P1 |
| B3 | P2 | P3 | P4 | P5 | P6 | P7 | P1 | P2 | P3 | P4 | P5 |
| B4 | P6 | P7 | P1 | P2 | P3 | P4 | P5 | P6 | P7 | P1 | P2 |
| B5 | P3 | P4 | P5 | P6 | P7 | P1 | P2 | P3 | P4 | P5 | P6 |
| B6 | P7 | P1 | P2 | P3 | P4 | P5 | P6 | P7 | P1 | P2 | P3 |
| B7 | P4 | P5 | P6 | P7 | P1 | P2 | P3 | P4 | P5 | P6 | P7 |

FIG. 15E

|    | B1 | B2 | B3 | B4 | B5 | B6 | B7 |
|----|----|----|----|----|----|----|----|
|    | P1 | P2 | P3 | P4 | P5 | P6 | P7 |
|    | P6 | P7 | P1 | P2 | P3 | P4 | P5 |
|    | P4 | P5 | P6 | P7 | P1 | P2 | P3 |
|    | P2 | P3 | P4 | P5 | P6 | P7 | P1 |
|    | P7 | P1 | P2 | P3 | P4 | P5 | P6 |
|    | P5 | P6 | P7 | P1 | P2 | P3 | P4 |
|    | P3 | P4 | P5 | P6 | P7 | P1 | P2 |
|    | P1 | P2 | P3 | P4 | P5 | P6 | P7 |
|    | P6 | P7 | P1 | P2 | P3 | P4 | P5 |
|    | P4 | P5 | P6 | P7 | P1 | P2 | P3 |
|    | P2 | P3 | P4 | P5 | P6 | P7 | P1 |
|    | P7 | P1 | P2 | P3 | P4 | P5 | P6 |
|    | P5 | P6 | P7 | P1 | P2 | P3 | P4 |
|    | P3 | P4 | P5 | P6 | P7 | P1 | P2 |
|    | P1 | P2 | P3 | P4 | P5 | P6 | P7 |

FIG. 15F

|    | B1 | B2 | B3 | B4 | B5 | B6 | B7 |
|----|----|----|----|----|----|----|----|
|    | P1 | P2 | P3 | P4 | P5 | P6 | P7 |
|    | P7 | P1 | P2 | P3 | P4 | P5 | P6 |
|    | P6 | P7 | P1 | P2 | P3 | P4 | P5 |
|    | P5 | P6 | P7 | P1 | P2 | P3 | P4 |
|    | P4 | P5 | P6 | P7 | P1 | P2 | P3 |
|    | P3 | P4 | P5 | P6 | P7 | P1 | P2 |
|    | P2 | P3 | P4 | P5 | P6 | P7 | P1 |
|    | P1 | P2 | P3 | P4 | P5 | P6 | P7 |
|    | P7 | P1 | P2 | P3 | P4 | P5 | P6 |
|    | P6 | P7 | P1 | P2 | P3 | P4 | P5 |
|    | P5 | P6 | P7 | P1 | P2 | P3 | P4 |
|    | P4 | P5 | P6 | P7 | P1 | P2 | P3 |
|    | P3 | P4 | P5 | P6 | P7 | P1 | P2 |
|    | P2 | P3 | P4 | P5 | P6 | P7 | P1 |

LIGHTING DEVICE AND LIGHTING SYSTEM

CROSS REFERENCE TO RELATED APPLICATION

This application claims the benefit of priority of Japanese Patent Application Number 2015-045008 filed on Mar. 6, 2015, the entire contents of which are hereby incorporated, by reference.

BACKGROUND

1. Technical Field

The present disclosure relates to lighting devices and lighting systems for performing visible light communication.

2. Description of the Related Art

Visible light communication systems for transmitting information by turning on and off a lighting device are known (refer to PCT International Publication No. WO 2014/103341, for example). In such visible light communication systems, for example, identification information for identifying the lighting device or position information indicating a position of the lighting device is superimposed onto light emitted by the lighting device and transmitted.

SUMMARY

In some cases, however, the conventional visible light communication systems described above require a long time to obtain such information (light signal).

In view of this, an object of the present disclosure is to provide a lighting device and a lighting system which enable a receiver to obtain information ion in a short time period.

In order to achieve the above object, a lighting device according to an aspect of the present disclosure, which performs visible light communication with a receiver including an image sensor, includes: a dividing unit that divides identification information assigned to the lighting device into N packets (where N is a natural number greater than or equal to 2); a block generator that generates a plurality of signal blocks each of which includes M packets (where M is a natural number greater than or equal to N) that includes at least one of each of the N packets; and a light source that sequentially transmits the plurality of signal blocks in either one of (i) each frame cycle of the image sensor and (ii) each cycle substantially equal to an integral multiple of the frame cycle, by superimposing each of the plurality of signal blocks onto illumination light. The block generator generates the plurality of signal blocks so that an order of arranging the M packets is different between consecutive signal blocks in the plurality of signal blocks.

Furthermore, in order to achieve the above object, a lighting system according to another aspect of the present disclosure includes the lighting device and the receiver.

The present disclosure enables a receiver to obtain information in a short time period.

BRIEF DESCRIPTION OF DRAWINGS

The figures depict one or more implementations in accordance with the present teaching, by way of examples only, not by way of limitations. In the figures, like reference numerals refer to the same or similar elements.

FIG. 6A is a timing diagram indicating a transmission timing and a scan timing of each signal block according to the present embodiment.

FIG. 7 is a timing diagram indicating another example of a transmission timing and a scan. timing of each signal block according to the present embodiment.

FIG. 9 is a diagram illustrating still another example of a structure of signal blocks each of which includes identification information divided into four pieces (where M=11) according to the present embodiment.

FIG. 10 is a diagram illustrating an example of a structure of signal blocks each of which includes identification information divided into two pieces (where M=3) according to the present embodiment.

FIG. 11A is a diagram illustrating an example of a structure of signal blocks each of which includes identification information divided into three pieces (where M=4) according to the present embodiment.

FIG. 11B is a diagram illustrating another example of a structure of signal blocks each of which includes identification information divided into three pieces (where M=5) according to the present embodiment.

FIG. 11C is a diagram illustrating still another example of a structure of signal blocks each of which includes identification information divided into three pieces (where M=7) according to the present embodiment.

FIG. 12A is a diagram illustrating an example of a structure of signal blocks each of which includes identification information divided into four pieces (where M=5) according to the present embodiment.

FIG. 12B is a diagram illustrating another example of a structure of signal blocks each of which includes identification information divided into four pieces (where M=6) according to the present embodiment.

FIG. 12C is a diagram illustrating still another example of a structure of signal blocks each of which includes identification information divided into four pieces (where M=6) according to the present embodiment.

FIG. 12D is a diagram illustrating still another example of a structure of signal blocks each of which includes identification information divided into four pieces (where M=7) according to the present embodiment.

FIG. 13A is a diagram illustrating an example of a structure of signal blocks each of which includes identification information divided into five pieces (where M=6) according to the present embodiment.

FIG. 13B is a diagram illustrating another example of a structure of signal blocks each of which includes identification information divided into five pieces (where M=7) according to the present embodiment.

FIG. 13C is a diagram illustrating still another example of a structure of signal blocks each of which includes identification information divided into five pieces (where M=8) according to the present embodiment.

FIG. 13D is a diagram illustrating still another example of a structure of signal blocks each of which includes identification information divided into five pieces (where M=9) according to the present embodiment.

FIG. 14A is a diagram illustrating an example of a structure of signal blocks each of which includes identification information divided into six pieces (where M=7) according to the present embodiment.

FIG. 14B is a diagram illustrating another example of a structure of signal blocks each of which includes identification information divided into six pieces (where M=8) according to the present embodiment.

FIG. 14C is a diagram illustrating still another example of a structure of signal blocks each of which includes identification information divided into six pieces (where M=9) according to the present embodiment.

FIG. 14D is a diagram illustrating still another example of a structure of signal blocks each of which includes identification n information divided into six pieces (where M=10) according to the present embodiment.

FIG. 14E is a diagram illustrating still another example of a structure of signal blocks each of which includes identification information divided into six pieces (where M=11) according to the present embodiment.

FIG. 15A is a diagram illustrating an example of a structure of signal. blocks each of which includes identification information divided into seven pieces (where M=8) according to the present embodiment.

FIG. 15B is a diagram illustrating another example of a structure of signal blocks each of which includes identification information divided into seven pieces (where M=9) according to the present embodiment.

FIG. 15C is a diagram illustrating still another example of a structure of signal blocks each of which includes identification information divided into seven pieces (where M=10) according to the present embodiment.

FIG. 15D is a diagram illustrating still another example of a structure of signal blocks each of which includes identification information divided into seven pieces (where M=11) according to the present embodiment.

FIG. 15E is a diagram illustrating still another example of a structure of signal blocks each of which includes identification information divided into seven pieces (where M=12) according to the present embodiment.

FIG. 15F is a diagram illustrating still another example of a structure of signal blocks each of which includes identification information divided into seven pieces (where M=13) according to the present embodiment.

DETAILED DESCRIPTION OF EMBODIMENT

Figure 1:
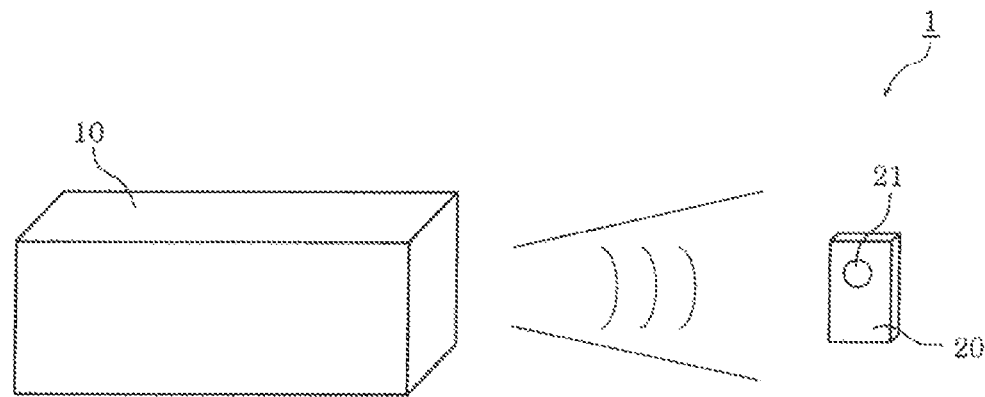
FIG. 1 is a schematic diagram illustrating a lighting system according to a present embodiment.

Hereinafter, a lighting device and a lighting system according to an exemplary embodiment are described in detail with reference to the accompanying drawings. The embodiment described below is a particular example. The numerical values, shapes, materials, elements, the arrangement and connection of the elements, steps, the order of the steps, and others indicated in the exemplary embodiment are merely examples, and therefore are not intended to limit the inventive concept. Thus, among the elements in the following embodiment, elements not recited in any of the independent claims defining the most generic part of the inventive concept are described as arbitrary elements.

The drawings are schematic diagrams, and do not necessarily provide strictly accurate illustration. In the respective diagrams, identical reference numerals are used throughout to designate identical elements.

Embodiment

[Lighting System]

First, the outline of a lighting system (visible light communication system) according to a present embodiment will be described with reference to FIG. 1. FIG. 1 is a schematic diagram illustrating lighting system 1 according to the present embodiment.

Lighting system 1 according to the present embodiment performs visible light communication in accordance with, for example, a communication system prescribed in CP-1223 "Visible Light Beacon System" (non-patent literature), Japan Electronics and Information Technology Industries Association (JEITA), May 2013.

As illustrated in FIG. 1, lighting system 1 includes lighting device 10 and receiver 20.

Lighting device 10 performs visible light communication with receiver 20. For example, lighting device 10 illuminates the area around lighting device 10 by emitting illumination light (visible light). The illumination light is superimposed with identification information assigned. to lighting device 10. In other words, the illumination light is a light signal including the identification information as a visible light communication signal. The structure of lighting device 10 will be described in more detail later with reference to FIG. 3.

Receiver 20 performs visible light communication with lighting device 10. Examples of receiver 20 include various portable information terminals, such as a portable telephone, a smartphone, and a tablet personal computer (tablet PC). Receiver 20 includes image sensor 21 as illustrated in FIG. 1.

Image sensor 21 is an imaging device that receives illumination light (visible light) emitted by lighting device 10. In the present embodiment, image sensor 21 uses a rolling shutter method.

Figure 2:
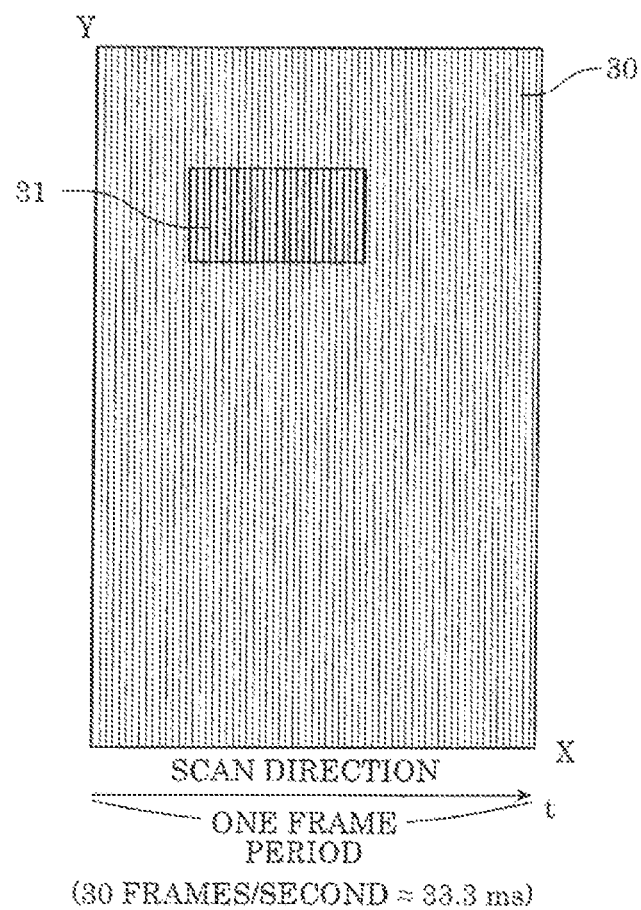
FIG. 2 is a diagram illustrating an image captured by an image sensor included in a receiver according to the present embodiment.

FIG. 2 is a diagram illustrating image 30 captured by image sensor 21 included in receiver 20 according to the present embodiment. More specifically, FIG. 2 illustrates an image generated by image sensor 21 capturing lighting device 10 illustrated in FIG. 1. Image 30 has illumination-light region 31 that shows illumination light received from lighting device 10.

Illumination-light region 31 is, more specifically, a region showing an image of lighting device 10. Receiver 20 can obtain the identification information transmitted by lighting device 10, by detecting a light intensity (an amount of the received illumination light) on illumination-light region 31.

A direction of scanning performed by image sensor 21 using a rolling shutter method is, for example, the positive direction of an x-axis as illustrated in FIG. 2. Image sensor 21 can capture one frame of image 30 per scan.

Image sensor 21 repeats the scanning in each predetermined frame cycle to sequentially capture images 30. A frame rate of image sensor 21 is, for example, 30 frames per second. In other ords, a frame cycle (hereinafter, referred to also as a "frame period") is approximately 33.3 msec. It should be noted that the frame rate of image sensor 21 is not particularly limited. The frame rate may be, for example, 60 frames per second.

[Lighting Device]

Figure 3:
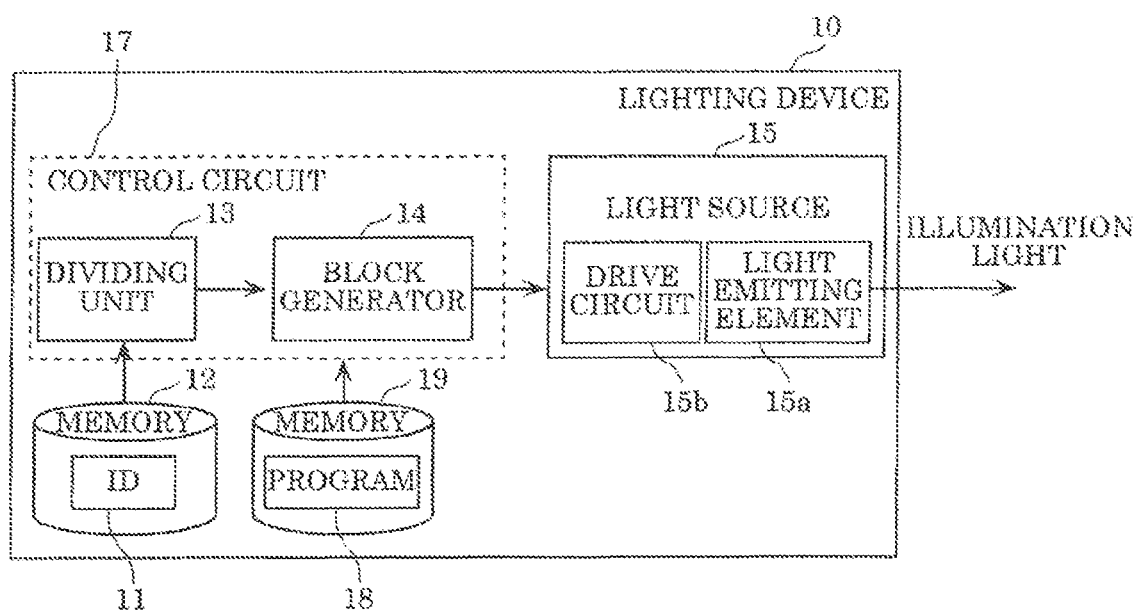
FIG. 3 is a block diagram illustrating a structure of a lighting device according to the present embodiment.

FIG. 3 is a block diagram illustrating the structure of lighting device 10 according to the present embodiment. As illustrated in FIG. 3, lighting device 10 includes memory 12 in which identification information 11 is stored, dividing unit 13, block generator 14, and light source 15.

An example of identification information 11 is information for unique identifying lighting device 10. Examples of identification information 11 include identification information uniquely assigned to lighting device 10 and position information indicating a position of lighting device 10. Identification information 11 has a predetermined bit length. For example, a bit length of identification information 11 is 128 bits.

Memory 12 is a storage device in which identification information 11 is stored. An example of memory 12 is a semiconductor memory, such as a Read Only Memory (ROM).

Dividing unit 13 divides identification information 11 into N packets, where N is a natural number greater than or equal to 2. More specifically, dividing unit 13 reads identification information 11 from memory 12 and divides identification information 11 by a predetermined division number N to generate N packets.

It should be noted that receiver 20 cannot restore identification information 11 until all the divided N packets have been received. Missing of even one of the N packets prevents receiver 20 from restoring identification information 11.

Each of the N packets is uniquely assigned with a packet number in a range from 1 to N. inclusive, for example. The following describes an example where N=4.

Figure 4:
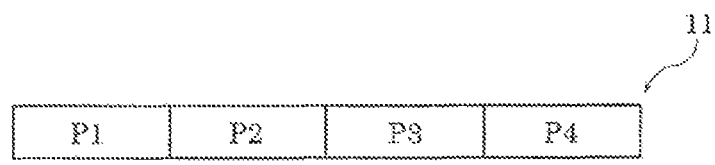
FIG. 4 is a diagram illustrating identification information divided, into four pieces according to the present embodiment.

FIG. 4 is a diagram illustrating identification information 11 that is divided into four pieces according to the present embodiment.

As illustrated in FIG. 4, identification information 11 is divided into four packets. The four packets have the same size (bit number), for example. For example, if identification information 11 has 128 bits, each of the four packets has 32 bits.

The four packets are respectively assigned with packets numbers from "1" to "4". Hereinafter, for explanatory convenience, a packet number is expressed as P added with a numeral, such as "P1". An expression "packet P" with a numeral, such as "Packet P1", means a packet having a packet number represented by the numeral (for example, 1).

Referring back to FIG. 3, block generator 14 generates a plurality of signal blocks. Each of the signal blocks consists of M packets, where M is a natural number greater than or equal to N. The M packets in each of the signal blocks include at least one of each of the N packets. In other words, each of the signal blocks includes at least one identification information 11.

Block generator 14 generates the plurality of signal blocks so that an order of arranging packets is different among consecutive signal blocks in the plurality of signal blocks, More specifically, block generator 14 generates the plurality of signal blocks so that the Lth packet in a signal block is different from the Lth packet in another signal block to be transmitted immediately before the signal block. Here, L is a natural number in a range from 1 to M, inclusive, In the present embodiment, block generator 14 generates the plurality of signal blocks so that the Lth packet is different between consecutive N signal blocks in the plurality of signal blocks. For example, L is an arbitrary natural number in a range from 1 to M, inclusive, In other words, block generator 14 generates the plurality of signal blocks so that the Lth packet placed at an arbitrary Lth position is different between consecutive N signal blocks in the plurality of signal blocks.

The processing performed by block generator 14 and the structure of the signal blocks will be described in more detail later.

It should be noted that, in the present embodiment, each of the expressions "immediately before", "immediately after", and "adjacent" means that no other signal block is transmitted therebetween. For example, if it is described that a second signal block is transmitted "immediately before" a first signal block, no other signal block is transmitted between the transmission of the second signal block and the transmission of the first signal block. Similarly, no other signal block is transmitted between transmission of a signal block and transmission of another signal block "immediately before" the signal block, and between transmissions of "adjacent" signal blocks.

Light source 15 sequentially transmits the plurality of signal blocks in each frame cycle of image sensor 21 by superimposing each of the signal blocks onto illumination light. For example, light source 15 transmits the plurality of signal blocks generated by block generator 14, sequentially in a predetermined. order and in synchronization with a start of scanning performed by image sensor 21. In this way, light source 15 repeatedly transmits identification information 11.

Light source 15 includes light emitting element 15a, such as a plurality of Light Emitting Diodes (LEDs). Examples of the LEDs are white LEDs. Light source 15 may include a laser element, an organic Electro Luminescence (EL) device, or an inorganic EL device, instead of LEDs. Light source 15 further includes, for example, drive circuit 15b that drives light emitting element 15a. Drive circuit 15b drives light emitting element 15a based on an output of block generator 14. Drive circuit 15b includes, for example, circuit parts such as a plurality of transistors.

Light source 15 switches a light intensity of the LEDs (for example, switches on and off the LEDs) to superimpose signal blocks onto illumination light, thereby transmitting the signal blocks. For example, light source 15 includes a transistor and a signal generator. The transistor switches on and off the LEDs. The signal generator generates a gate signal for controlling the switching of the transistor. The signal generator generates the gate signal according to the plurality of signal blocks generated by block generator 14 and the frame cycle of image sensor 21.

The frame cycle of image sensor 21 is indicated by receiving-cycle information that is held in, for example, memory 12. Alternatively, lighting device 10 may obtain the receiving-cycle information from the outside. An example of how to obtain the receiving-cycle information will be described later according to a variation of the present embodiment.

It should be noted that, as illustrated in FIG. 3, dividing unit 13 and block generator 14 are realized by, for example, control circuit 17, such a Central Processing Unit (CPU) or a microcomputer. Control circuit 17 includes a processor, input/output ports, a volatile memory, and the like. Control circuit 17 performs the functions of dividing unit 13 and block generator 14 by, for example, reading program 18 from memory 19 holding program 18 and executing program 18. Memory 19 is a non-volatile memory, such as a flash memory.

[Signal Block]

Figure 5:
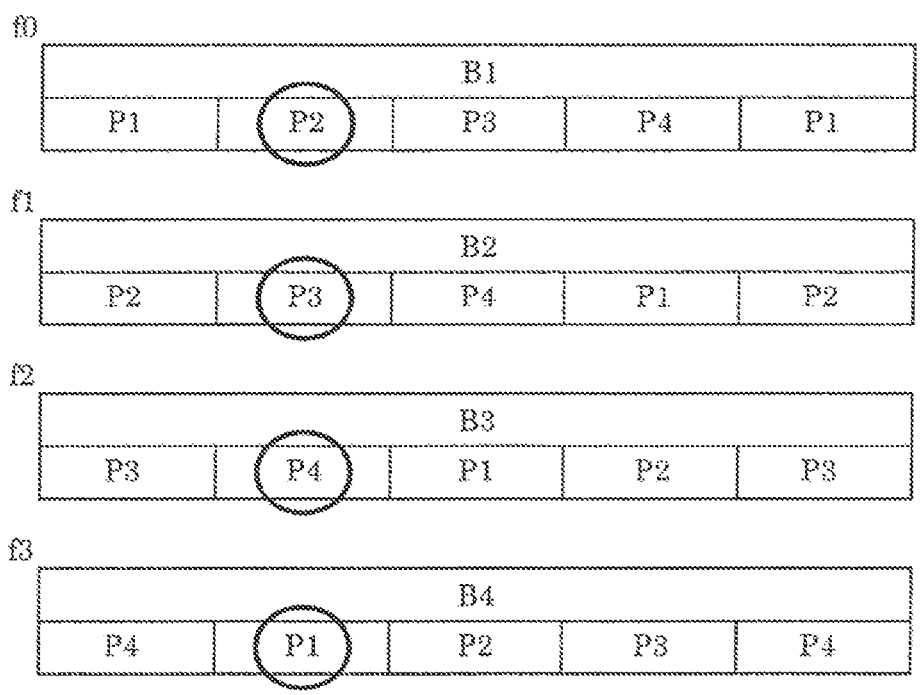
FIG. 5 is a diagram illustrating an example of a structure of signal blocks each of which includes identification information divided into four pieces (where M=5) according to the present embodiment.

FIG. 5 is a diagram illustrating an example of the structure of signal blocks each of which includes identification information 11 divided into four packets according to the present embodiment. FIG. 5 illustrates an example where the number M of packets included in each of four signal blocks Bi to B4 is five.

Signal block B1 is a signal block to be transmitted at time f0. Signal block B1 includes packet P1, packet P2, packet P3, packet P4, and packet P1 in this order.

Signal block B2 is a signal block to be transmitted at time f1, immediately after signal block B1. Signal block B2 includes packet P2, packet P3, packet P4, packet P1, and packet P2 in this order.

Signal block B3 is a signal block to be transmitted at time f2, immediately after signal block B2. Signal block B3 includes packet P3, packet P4, packet P1, packet P2, and packet P3 in this order.

Signal block B4 is a signal block to he transmitted at time f3, immediately after signal block B3. Signal block B4 includes packet P4, packet P1, packet P2, packet P3, and packet P4 in this order.

As illustrated in FIG. 5, each of signal blocks B1 to B4 includes packet P1 as a packet next to packet P4. In other words, each of signal blocks B1 to B4 includes five packets so that a sequence of packets "P1" to "P4" is repeated throughout signal blocks B1 to B4.

In the present embodiment, block generator 14 generates a plurality of signal blocks so that the N packets are repeatedly transmitted in a predetermined order of packet numbers. An example of the predetermined order is an ascending order of the packet numbers.

More specifically, packet numbers are sequential in a predetermined order throughout consecutive signal blocks. For example, if N packets arranged in an ascending order of packet numbers is repeatedly transmitted, the packets numbers are sequential in the ascending order throughout consecutive signal blocks. In other words, a packet number of the first packet in a signal block among a plurality of signal blocks is next in the ascending order to a packet number of the last packet in another signal block to be transmitted immediately before the signal block.

For example, as illustrated in FIG. 5, since a packet number of the last packet in signal block B1 is "P1", a packet number of the first packet in signal block B2 is "P2". Likewise, packet numbers are sequential also between signal block B2 and signal block B3 and between signal block B3 and signal block B4. Lighting device 10 sequentially transmits four signal blocks B1 to B4 in this order. In other words, a sequence of the four packets arranged in an ascending order of packet numbers (packets P1 to P4) is repeatedly transmitted.

Furthermore, according to the present embodiment, a shift amount is, for example, (i) a value other than a divisor of N or a value of 1. The shift amount is a value representing an amount of shift between packet numbers of adjacent signal blocks.

More specifically, the shift amount indicates a difference between a packet number of the Lth packet in a signal block among the plurality of signal blocks (hereinafter, referred to as a "first packet number") and a packet number of the Lth packet in another signal block transmitted immediately before the signal block (hereinafter, referred to as a "second packet number"). The shift amount is, for example, a value obtained by subtracting the second packet number from the first packet number. However, if the first packet number is smaller than the second packet number, the shift amount is determined to be a value obtained by subtracting the second packet number from a value obtained by adding N to the first packet number.

In the example illustrated in FIG. 5, the shift amount at an arbitrary position L is the same between any adjacent signal blocks. Specifically, in this example, the shift amount is 1. In other words, in FIG. 5, whichever position is selected to compare packets, the difference in packet number (shift amount) is the same between any adjacent signal blocks.

In the present embodiment, for example, lighting device 10 repeats transmission of four signal blocks B1 to B4. More specifically, signal block B1 is transmitted after signal block B4. For example, the division number N is equal to the number of signal blocks included in a sequence of signal blocks which is repeatedly transmitted. For example, if identification information 11 is divided into N packets, block generator 14 generates N unique signal blocks. Light source 15 repeatedly transmits a sequence of the N unique signal blocks.

[Transmission Timing and Scan Timing (Matching Case)]

Figure 6B:
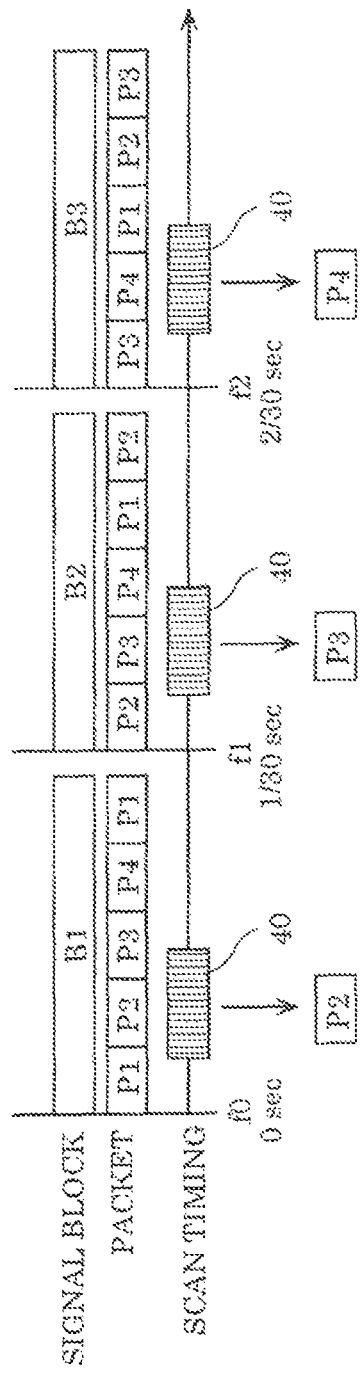
FIG. 6B is a timing diagram indicating a transmission timing and a scan tinning of each signal block according to the present embodiment.

FIG. 6A and FIG. 6B are timing diagrams indicating the timing at which transmission of a signal block starts (referred to also as a "transmission timing") and the timing at which scan starts (referred to also as a "scan timing") according to the present embodiment. FIG. 6A and FIG. 6B show examples where the scan timing and the transmission timing match each other.

For example, image sensor 21 starts scanning at time f0, time f1, and time f2. In the present embodiment, a frame rate of image sensor 21 is approximately 30 fps. Therefore, in the case where time f0 is 0 second, time f1 is $\frac{1}{30}$ second (approximately 33.3 msec) and time f2 is $\frac{2}{30}$ seconds (approximately 66.6 msec).

As illustrated in FIG. GA and FIG. 6B, light source 15 sequentially transmits signal block B1, signal block B2, and signal block B3 at time f0, time f1, and time f2, respectively.

In these examples, if image sensor 21 captures an image of lighting device 10 on a sufficiently large region, for example if illumination-light region 31 illustrated in FIG. 2 is substantially equal to image 30 in size, receiver 20 can receive all the five packets included in signal block B1 in one frame period. In other words, receiver 20 can restore identification information 11 because receiver 20 can receive packets P1 to P4 in one frame period.

On the other hand, if image sensor 21 captures an image of lighting device 10 on a small region, for example if illumination-light region 31 can show oniy a part of image 30 as illustrated in FIG. 2, receiver 20 cannot receive all packets P1 to P4 in one frame period. More specifically, receiver 20 can receive only packet(s) that is/are transmitted in a predetermined part (receivable period 40 hatched in FIG. 6B) of one frame period.

Receivable period 40 corresponds to a size of illumination-light region 31. More specifically, receivable period 40 is a period during which image sensor 21 using a rolling shutter method scans illumination-light region 31. Image sensor 21 can receive only illumination light that is emitted by lighting device 10 during scanning of illumination-light region 31, in other words, during receivable period 40.

For example, in a period before receivable period 40, image sensor 21 scans a region located in the negative direction of the x-axis with respect to illumination-light region 31, in other words, a region on which illumination light cannot be received. Therefore, image sensor 21 cannot receive illumination light in this period. For the same reason, image sensor 21 fails to receive illumination light also in a period after receivable period 40.

In general, illumination-light region 31 appears at substantially the same position on different frames unless receiver 20 moves at a high speed. Therefore, the position of receivable period 40 in one frame period is substantially the same among a plurality of frames. In other words, there is a high possibility that receiver 20 can receive packets placed at the same position in an order among the frames.

For example, as illustrated in FIG. 6B, in a period from time f0 to time f1, receiver 20 receives only the second packet of signal block B1, namely, packet P2. Subsequently, in the same manner, in a period from time f1 to time f2, receiver 20 receives only the second packet of signal block B2, namely, packet P3. In a period from time f2 to time f3, receiver 20 receives only the second packet of signal block B3, namely, packet P4.

In the present embodiment, as illustrated in FIG. 5, a plurality of signal blocks are generated so that the Lth packet in a signal block is different from the Lth packet in another signal block to be transmitted immediately before the signal block. More specifically, with regard to the Lth packet in each of generated signal blocks, a packet number is successively incremented by 1 in the signal blocks.

Therefore, for example, if only the second packet (marked by a circle in FIG. 5) can be received from each signal block, receiver 20 can receive packet P2 from signal block B1 in the first frame. Subsequently, in the same manner, receiver 20 receives packet P3 from signal block B2 in the second frame, receives packet P4 from signal block B3 in the third frame, and receives packet P1 from signal block B4 in the fourth frame. As a result, receiver 20 can receive packets P1 to P4 in the four frame periods to restore identification information 11.

If a packet number of the lath packet is not different among signal blocks, for example, if an order of packet numbers is the same among all the signal blocks, receiver 20 receives the same packets only. For example, receiver 20 receives only packets P2 in frame periods. Receiver 20 thus cannot restore identification information 11 until receiver 20 receives the other packets accidentally (for example, due to move of receiver 20). As a result, the obtainment of identification information 11 requires a long time.

In contrast, in the present embodiment, a packet number of the Lth packet is different among signal blocks. It is therefore possible to respectively receive different packets in different frame periods as described previously. As a result, receiver 20 can obtain identification information 11 in a short time period.

If a plurality of packets can be received in one frame period, receiver 20 can restore identification information 11 in a shorter time period.

For example, if the second and third packets can be received in one frame period, receiver 20 can receive packet P2 and packet P3 from signal block B1 in the first frame. In the second frame, receiver 20 receives packet. P3 and packet P4 from signal block 132. Here, as packet P3 has already been received, newly received packet P3 is discarded. In the third frame, receiver 20 receives packet P4 and packet P1 from signal block B3. As a result, receiver 20 receives packets P1 to P4 in the three frame periods to restore identification information 11.

Similarly, for example, if three packets can be received in one frame period, receiver 20 receives packets P1 to P4 in two frame periods to restore identification information 11. If four packets can be received in one frame period, receiver 20 receives packets P1 to P4 in one frame period as illustrated in FIG. GA, and thereby restores identification information 11.

Thus, according to the present embodiment, receiver 20 can restore identification information 11 by receiving packets P1 to P4 in maximum four frame periods.

[Transmission Timing and Scan Timing (Not-Matching Case)]

FIG. 7 is a timing diagram indicating another example of the timing at which transmission of a signal block starts (transmission timing) and the timing at which scan starts (scan timing) according to the present embodiment.

Although FIG. 6A and FIG. 6B illustrate the examples where the scan timing and the transmission timing match each other for each signal block, the present disclosure is not limited to these examples. As illustrated in FIG. 7, it is also expected that there is a time lag between the scan timing and the transmission timing.

If there is a time lag between the scan timing and the transmission timing, receiver 20 cannot receive a packet that is being transmitted at a start (or end) of scanning. For example, as illustrated in. FIG. 7, receiver 20 cannot receive packet P4 that is being transmitted at time f1. In the first frame, receiver 20 can receive only packets P1 to P3.

In this example, if a packet number of the Lth packet is not different among the signal blocks, for example, if an order of packet numbers is the same among all the signal blocks, receiver 20 never receives the fourth packet, namely, packet P4. Receiver 20 thus cannot restore identification information 11 until receiver 20 receives packet P4 accidentally (for example, due to move of receiver 20). As a result, the obtainment of identification information 11 requires a long time.

In contrast, in the present embodiment, with regard to the Lth packet in each of signal blocks, a packet number is successively incremented by 1 in the signal blocks. As a result, in the example illustrated in FIG. 7, receiver 20 can receive packets P2 to P4 in the second frame. Receiver 20 can eventually receive packets P1 to P4 in two frame periods to restore identification information 11.

[Other Examples of Signal Blocks]

Figure 8:
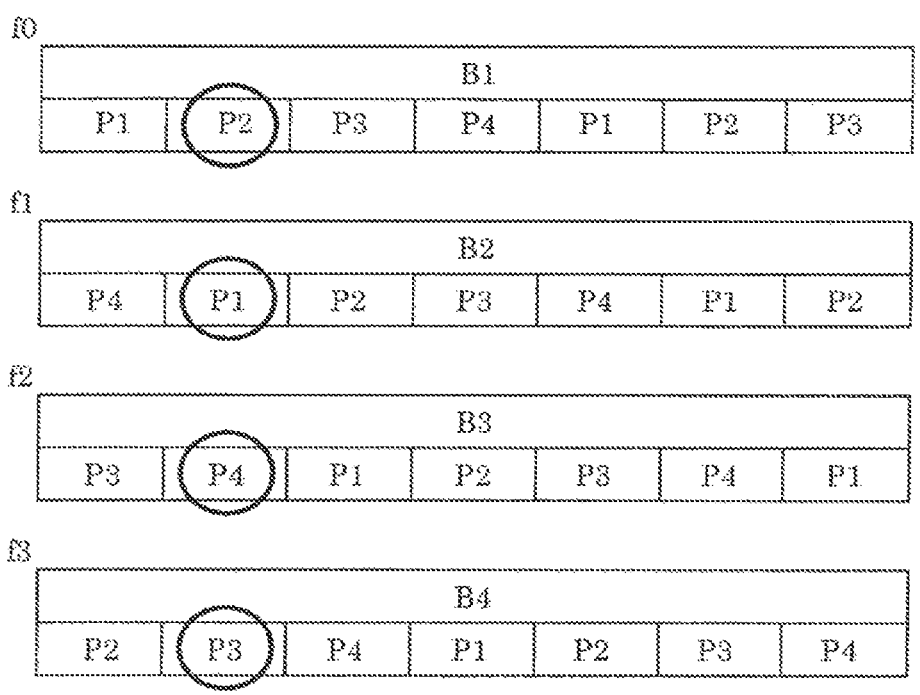
FIG. 8 is a diagram illustrating another example of a structure of signal blocks each of which includes identification information divided into four pieces (where M=7) according to the present embodiment.

Referring to FIG. 8 and FIG. 9, other examples of signal blocks in the case where identification information 11 is divided into four packets are described below. FIG. 8 and FIG. 9 illustrate other examples of a structure of signal blocks each of which includes identification information 11 divided into four packets according to the present embodiment. More specifically, FIG. 8 illustrates an example where M=7 and a shift amount=3, and FIG. 9 illustrates an example where M=11 and a shift amount=3.

For example, if a length of a packet (packet length) is shorter, more packets can be transmitted in one frame period. In other words, as illustrated in FIG. 8 and FIG. 9, a single signal block includes more packets. For example, in the example illustrated in FIG. 9, a single signal block includes two pieces of same identification information 11. In other words, a single signal block includes at least two packets of each of four packets P1 to P4.

As a packet is shorter, more packets can be included in receivable period 40. It is therefore possible to receive thur packets in a shorter time period to restore identification information 11.

Furthermore, even if receivable period 40 is short, in other words, even if illumination-light region 31 is small, a shorter length of a packet increases a possibility of receiving packet(s). It is therefore possible to obtain identification information 11 from a smaller image of lighting device 10, for example, from lighting device 10 at a greater distance.

[Other Examples]

Referring to FIGS. 10 to 15F, examples of division number N, by which. identification information 11 is divided into packets, and signal blocks generated according to division number N are described. In each of the figures, each of a region framed by a thick line, a region framed by a thick broken line, and each of regions illustrated by predetermined hatchings or dots includes identification information 11. In other words, receiving of packets included in each of these regions enables receiver 20 to restore identification information 11.

The following describes patterns for restoring identification information 11. More specifically, the following describes various combinations of (i) the number of packets receivable in one frame period and (ii) the number of frame periods required for receiving the N packets, in which either the number of receivable packets or the number of required frame periods is minimum. For example, in the case where receiving of three packets in two frame periods can restore identification information 11, the restoration of identification information 11 is also possible (i) if at least four packets can be received in two frame periods and (ii) if three packets are received in at least three frame periods.

It should be noted that the division number and the signal blocks are not limited to the following examples. Furthermore, the patterns for restoring identification information 11 are not limited to the following examples, either.

Example 1

N=2

FIG. 10 is a diagram illustrating an example of a structure of signal blocks each of which includes identification information 11 divided into two packets (where M=3) according to the present embodiment. As illustrated in FIG. 10, receiver 20 can restore identification information 11, if two packets are received in one frame period and if one packet is received in each of two frame periods.

Example 2

N=3

FIGS. 11A to 11C are diagrams illustrating examples of a structure of signal blocks each of which includes identification information 11 divided into three packets according to the present embodiment. More specifically, FIG. 11A illustrates an example where M=4, FIG. 11B illustrates an example where M=5, and FIG. 11C illustrates an example where M=7.

As illustrated in FIGS. 11A to 11C, receiver 20 can restore identification information 11 in the following cases: (i) where three packets are received in one frame period, (ii) where two packets are received in each of two frame periods, and (iii) where one packet is received in each of three frame periods.

Example 3

N=4

FIGS. 12A to 12D are diagrams illustrating examples of a structure of signal blocks each of which includes identification information 11 divided into four packets according to the present embodiment. More specifically, FIG. 12A illustrates an example where M=5, FIG. 12B illustrates an example where M=6, FIG. 12C illustrates an example where M=6, and FIG. 12D illustrates an example where M=7.

As illustrated in FIGS. 12A to 12D, receiver 20 can restore identification information 11 in the following cases: (i) where four packets are received in one frame period, (ii) where three packets are received in each of two frame periods, (iii) where two packets are received in each. of three frame periods, and (iv) where one packet is received in each of four frame periods. It should be noted that FIG. 12A is the same as FIG. 5 described above, and that FIG. 12D is the same as FIG. 8 described above.

The example of FIG. 12B illustrates the case where a shift amount is two, in other words, a divisor of N. In this case, for example, packet numbers of the first packets in the signal blocks appear alternately "1" and "3". Therefore, if one packet is received in each of four frame periods, there is a risk that all the four kinds of packets cannot be received.

Therefore in the example illustrated in FIG. 12B, receiver 20 can restore identification information 11 (i) if four packets are received in one frame period and (ii) if two packets are received in each of two frame periods.

In the case where a shift amount is a divisor of N, the structure of a plurality of signal blocks as illustrated in FIG. 12C can increase the patterns for restoring identification information 11. In the example illustrated in FIG. 12C, receiver 20 can restore identification information 11 in the following cases: (i) where four packets are received in one frame period, (ii) where three packets are received in each of two frame periods, (iii) where two packets are received in each of three frame periods, and (iv) where one packet is received in each of four frame periods.

In the example illustrated in FIG. 12C, identification information 11 may be restored also if two packets are received in each of two frame periods. For example, if the first and second packets are received in each of two frame periods, receiver 20 can restore identification information 11 by receiving the first and second packets from each of signal block B3 and signal block B4 (or from each of signal block B1 and signal block B2).

Example 4

N=5

FIGS. 13A to 13D are diagrams illustrating examples of a structure of signal blocks each of which includes identification information 11 divided into five packets according to the present embodiment. More specifically, FIG. 13A illustrates an example where M=6, FIG. 13B illustrates an example where M=7, FIG. 13C illustrates an example where M=8, and FIG. 13D illustrates an example where M=9.

In the examples illustrated in FIG. 13A and FIG. 13D, receiver 20 can restore identification information 11 in the following cases: (i) where five packets are received in one frame period, (ii) where four packets are received in each of two frame periods, (iii) where three packets are received in each of three frame periods, (iv) where two packets are received in each of four frame periods, and (v) where one packet is received in each of five frame periods.

In the examples illustrated in FIG. 13B and FIG. 13C, receiver 20 can restore identification information 11 in the following cases: (i) where five packets are received in one frame period, (ii) where three packets are received in each of two frame periods, (iii) where two packets are received in each of three frame periods, and (iv) where one packet is received in each of five frame periods.

Example 5

N=6

FIGS. 14A to 14E are diagrams illustrating examples of a structure of signal blocks each of which includes identification information 11 divided into six packets according to the present embodiment. More specifically, FIG. 14A illustrates an example where M=7, FIG. 14B illustrates an example where M=8, FIG. 14C illustrates an example where M=9, FIG. 14D illustrates an example where M=10, and FIG. 14E illustrates an example where M=11.

In the examples illustrated in FIG. 14A and FIG. 14E, receiver 20 can restore identification information 11 in the following cases: (i) where six packets are received in one frame period, GO where five packets are received in each of two frame periods, (iii) where four packets are received in each of three frame periods, (iv) where three packets are received in each of four frame periods, (v) where two packets are received in each of five frame periods, and (vi) where one packet is received in each of six frame periods.

In the examples illustrated in FIG. 14B and FIG. 14D, receiver 20 can restore identification information 11 in the following cases: (i) where six packets are received in one frame period, (ii) where four packets are received in each of two frame periods, and (iii) where two packets are received in each of three frame periods.

In the example illustrated in FIG. 14C, receiver 20 can restore identification information 11 in the following cases: (i) where six packets are received in one frame period, and (ii) where three packets are received in each of two frame periods.

Example 6

N=7

FIGS. 15A to 15F are diagrams illustrating examples of a structure of signal blocks each of which includes identification information 11 divided into seven packets according to the present embodiment. More specifically, FIG. 15A illustrates an example where M=8, FIG. 15B illustrates an example where M=9, FIG. 15C illustrates an example where M=10, FIG. 15D illustrates an example where M=11, FIG. 15E illustrates an example where M=12, and FIG. 15F illustrates an example where M=13.

In the examples illustrated in FIG. 15A and FIG. 15F, receiver 20 can restore identification information 11 in the following cases: (i) where seven packets are received in one frame period, (ii) where six packets are received in each of two frame periods, (iii) where five packets are received in each of three frame periods, (iv) where four packets are received in each of four frame periods, (v) where three packets are received in each of five frame periods, (vi) where two packets are received in each of six frame periods, and (vii) where one packet is received in each of seven frame periods.

In the examples illustrated in FIG. 15B and FIG. 15E, receiver 20 can restore identification information 11 in the following cases: (i) where seven packets are received in one frame period, (ii) where five packets are received in each of two frame periods, (iii) where three packets are received in each of three frame periods, (iv) where two packets are received in each of four frame periods, and (v) where one packet is received in each of seven frame periods.

In the examples illustrated in FIG. 15C and FIG. 15D, receiver 20 can restore identification information 11 in the following cases: (i) where seven packets are received in one frame period, (ii) where four packets are received in each of two frame periods, (iii) where three packets are received in each of three frame periods, (iv) where two packets are received in each of five frame periods, and (v) where one packet is received in each of seven frame periods.

[Effects and Others]

As described above, lighting device 10 according to the present embodiment, which performs visible light communication with receiver 20 including image sensor 21, includes: dividing unit 13 that divides identification information 11 assigned to lighting device 10 into N packets (where N is a natural number greater than or equal to 2); block generator 14 that generates a plurality of signal blocks each of which includes M packets (where M is a natural number greater than or equal to N) that include at least one of each of the N packets; and light source 15 that sequentially transmits the plurality of signal blocks in each frame cycle of image sensor 12 by superimposing each of the plurality of signal blocks onto illumination light. Block generator 14 generates the plurality of signal blocks so that an order of arranging the M packets is different between consecutive signal blocks in the plurality of signal blocks.

With this structure, the order of arranging packets is different among the consecutive signal blocks. It is therefore possible to respectively receive different packets in different frame periods. As a result, even if illumination-light region 31 is small, receiver 20 can obtain identification information 11 in a short time period. Furthermore, each of the signal blocks includes identification information 11 (in other words, the N packets). As a result, if illumination-light region 31 is sufficiently large, identification information 11 can be obtained in one frame period. Thus, lighting device 10 according to the present embodiment enables receiver 20 to obtain identification information 11 in a short time period regardless of a size of illumination-light region 31, in other words, regardless of the receiving environments of receiver 20.

It is also possible, for example, that block generator 14 generates the plurality of signal blocks to have a different Lth packet (where L is a natural number in a range from 1 to M, inclusive) iii each of consecutive N signal blocks in the plurality of signal blocks.

With this structure, identification information 11 is divided into N packets in which the Lth packet is different among the consecutive signal blocks. As a result, it is possible to obtain identification information 11 by receiving only the Lth packet from each of the N signal blocks. In other words, it is possible to obtain identification information 11 in maximum N frame periods.

It is further possible, for example, that L is an arbitrary natural number in a range from 1 to M, inclusive.

With this structure, the Lth packet placed at an arbitrary Lth position is different among the N signal blocks. That is, packets placed. at any same position can be received. As a result, it is possible to increase a possibility of obtaining identification information 11 in a short time period.

It is still further possible, for example, that each of the N packets is assigned with a value in a range from 1 to N, inclusive, as a unique packet number, and that block generator 14 generates the plurality of signal blocks so that the N packets are repeatedly transmitted in a predetermined order of the packet numbers. An example of the predetermined, order is an ascending order of the packet numbers.

With this structure, a sequence of the N packets is repeated. As a result, identification information 11 can be obtained regardless of the timing at which receiver 20 receives a packet. If, for example, receiver 20 can sequentially receive the N packets, identification information 11 can be obtained in a shorter time period. For example, light device 10 according to the present embodiment is useful when, for example, receiver 20 includes a photodiode instead of image sensor 21 using a rolling shutter method.

It is still further possible, for example, that the packet numbers are sequential in the predetermined order throughout the consecutive signal blocks.

With this structure, the packet numbers are sequential in the signal blocks. As a result, identification information 11 can be received regardless of the timing at which receiver 20 receives a packet. For example, light device 10 according to the present embodiment is useful when receiver 20 includes a. photodiode instead of image sensor 21 using a rolling shutter method.

It is still further possible, for example, that a shift amount represents an amount of shift between the packet numbers of adjacent signal blocks in the consecutive signal blocks, and is either one of (i) a value other than a divisor of N and (ii) a value of 1.

This structure can increase the patterns for restoring identification information 11 as illustrated in FIGS. 10 to 15F. As a result, light device 10 according to the present embodiment enables receiver 20 to obtain identification information 11 in a short time period regardless of receiving environments of receiver 20.

Furthermore, for example, lighting system 1 according to the present embodiment includes lighting device 10 and receiver 20.

This configuration enables receiver 20 to obtain identification information 11 in a short time period.

[Variation 1]

The following describes a lighting system according to Variation 1 of the present embodiment with reference to the remaining figures.

Although the receiving-cycle information, which indicates a frame cycle of image sensor 21, is held in lighting device 10 according to the present embodiment, the present disclosure is not limited to this example. For example, lighting device 10 may obtain the receiving-cycle information from receiver 20 through communications with receiver 20.

Figure 16:
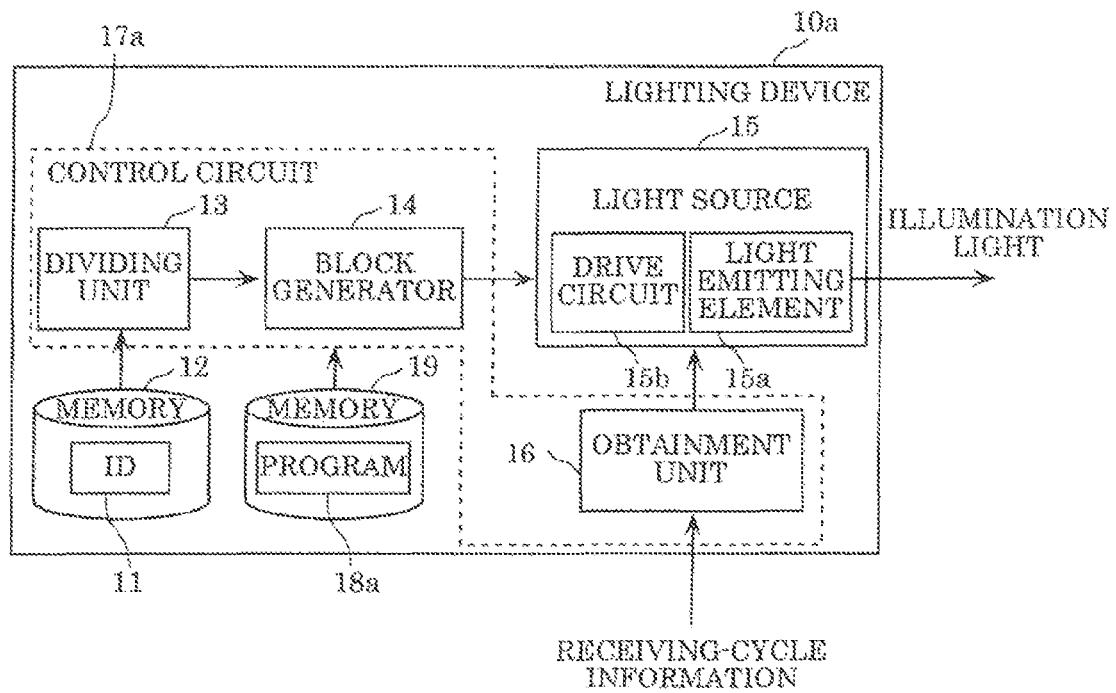
FIG. 16 is a block diagram illustrating a structure of a lighting device according to Variation 1 of the present embodiment.

FIG. 16 is a block diagram illustrating a structure of lighting device 10a according to Variation 1.

As illustrated in FIG. 16, lighting device 10a differs from lighting device 10 according to the present embodiment in that obtainment unit 16 is further included.

Obtainment unit 16 obtains receiving-cycle information indicating a frame cycle of image sensor 21. Obtainment unit 16 provides the obtained receiving-cycle information to light source 15. Light source 15 sequentially transmits a plurality of signal blocks in each frame cycle indicated by the receiving-cycle information obtained by obtainment unit 16. This processing has already been described in detail in the present embodiment.

Obtainment unit 16 is, for example, a communjcatjon unit that performs wireless communication with receiver 20 in accordance with a predetermined wireless communication standard. An example of the wireless communication standard is Bluetooth (registered trademark) Low Energy (BLE) However, the wireless communication standard is not limited to this example. The wireless communication standard may he Wi-Fi (registered trademark), ZigBee (registered trademark), or the like.

It should be noted that, as illustrated in FIG. 16, dividing unit 13, block generator 14, and obtainment unit 16 are realized by, for example, control circuit 17a, such a CPU or a microcomputer. Control circuit 17a includes a processor, input/output ports, a volatile memory, and the like. Control circuit 17a performs the functions of dividing unit 13, block generator 14, and obtainment unit 16 by, for example, reading program 18a from memory 19 holding program 18a and executing program 18a. Memory 19 is a non-volatile memory, such as a flash memory.

As described above, in the lighting system according to Variation 1, for example, lighting device 10a further includes obtainment unit 16 that obtains receiving-cycle information indicating a frame cycle of image sensor 21. Furthermore, in the lighting system according to Variation 1, light source 15 sequentially transmits a plurality of signal blocks in each frame cycle indicated by the receiving-cycle information obtained by obtainment unit 16.

The obtainment of the receiving-cycle information from receiver 20 enables lighting device 10a to dynamically change the transmission timing of a signal block in accordance with receiving performance of image sensor 21. For example, as illustrated in FIG. 7, it is thereby possible to prevent that a packet is transmitted at the timing in which scanning of image sensor 21 starts. As a result, receiver 20 can obtain identification information 11 in a shorter time period.

[Variation 2]

Next, the following describes a lighting system according to Variation 2 of the present embodiment with reference to the remaining figure.

Although lighting device 10a according to Variation 1 obtains the receiving-cycle information from receiver 20, the present disclosure is not limited to this example. For example, lighting device 20 may obtain transmission-cycle information from lighting device 10 through communications with lighting device 10.

Figure 17:
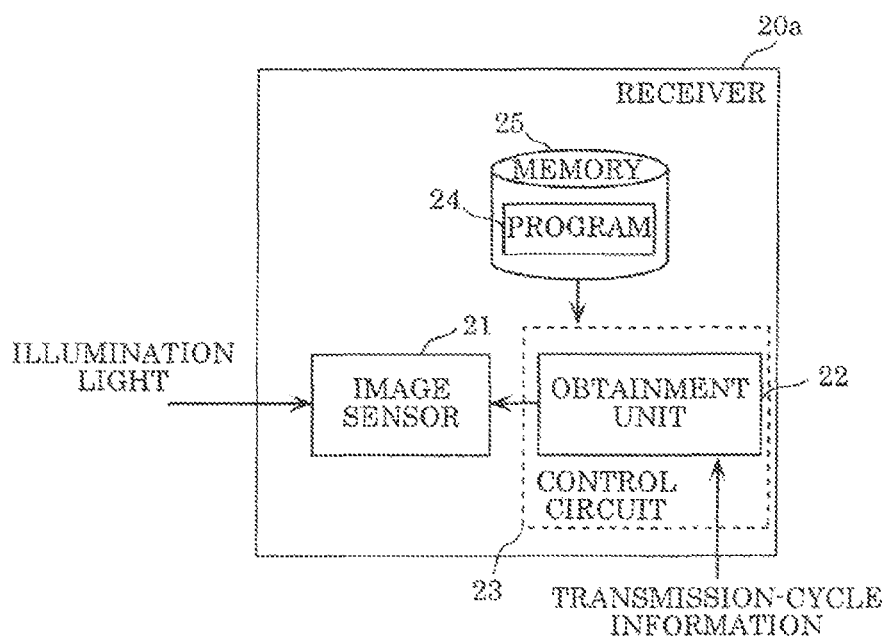
FIG. 17 is a block diagram illustrating a structure of a receiver according to Variation 2 of the present embodiment.

FIG. 17 is a block diagram illustrating a structure of lighting device 20a according to Variation 2.

As illustrated in FIG. 17, receiver 20a includes image sensor 21 and obtainment unit 22.

Obtainment unit 22 obtains transmission-cycle information indicating a transmission cycle in which lighting device 10 transmits a signal block. Obtainment unit 22 provides the obtained transmission-cycle information to image sensor 21. Image sensor 21 operates in a frame cycle that is the transmission cycle indicated by the transmission-cycle information obtained, by obtainment unit 22. This processing has already been described in detail in the present embodiment.

Obtainment unit 22 is, for example, a communication unit that performs wireless communication, with lighting device 10 in accordance with a predetermined wireless communication standard. An example of the wireless communication standard is BLE. However, the wireless communication standard is not limited to this example. The wireless communication standard may be (registered trademark), ZigBee (registered trademark), or the like.

It should be noted that, as illustrated in FIG. 17, obtainment unit 22 is realized by, for example, control circuit 23, such a CPU or a microcomputer. Control circuit 23 includes a processor, input/output ports, a volatile memory, and the like. Control circuit 23 performs the function of obtainment unit 22 by, for example, reading program 24 from memory 25 holding program 24 and executing program 24. Memory 25 is a non-volatile memory, such as a flash memory.

As described above, in the lighting system according to Variation 2, for example, receiver 20a further includes Obtainment unit 22 that obtains transmission-cycle information indicating a transmission cycle by which lighting device 10 transmits a signal block. Furthermore, in the lighting system according to Variation 2, image sensor 21 operates according to a frame cycle that is the transmission cycle indicated by the transmission-cycle information.

The obtainment of the transmission-cycle information from lighting device 10 enables receiver 20a to dynamically change the scan timing of image sensor 21 according to transmission performance of lighting device 10. Therefore, for example, as illustrated in FIG. 7, it is possible to prevent image sensor 21 from starting scanning while a packet is being transmitted. As a result, receiver 20a can obtain identification information 11 in a shorter time period.

[Other Variations]

Although the lighting device and the lighting system according to the present disclosure have been described with reference to the present embodiment and the variations of the present embodiment, it should be understood that the present disclosure is not limited to these present embodiment and variations.

For example, although light source 15 sequentially transmits a plurality of signal blocks in each frame cycle of image sensor 21 in the present embodiment, the present disclosure is not limited to this example. For example, light source 15 may substantially transmit a plurality of signal blocks in each cycle subsequently equal to an integral multiple of the frame cycle of image sensor 21.

In this case, if there is a problem of signal interference with another lighting device, for example, if a plurality of lighting devices 10 are located close to one another, the timing at which a signal block is transmitted is set to be different among the plurality of lighting devices 10. For example, if each of two lighting devices 10 transmits a signal block in a cycle that is twice the frame cycle, one of two lighting devices 10 transmits a signal block at time f0 and the other transmits a signal block at time f1. In other words, one of two lighting devices 10 does not transmit a signal block at f1 and the other does not transmit a signal block at time f0. This can prevent signal interference.

In the same manner, in Variation 2 described above, image sensor 21 may operate according to a frame cycle that is substantially equal to an integral fraction of the transmission cycle, in other words, a fraction of the transmission cycle where the denominator is an integer.

Furthermore, for example, although each of the signal blocks includes the N packets arranged in an ascending order of the packet numbers in the present embodiment, the present disclosure is not limited to this example. It is also possible that each of the signal blocks includes the N packets arranged in a descending order of the packet numbers or in a predetermined, order. For example, a signal block may include four packets P1 to P4 in an order of packet P3, packet P2, packet P4, and packet P1.

Furthermore, for example, an order of arranging the N packets may be different among the plurality of signal blocks. For example, it is possible that signal block B1 includes the N packets arranged in an ascending order of the packet numbers, and signal block B2 includes the N packets arranged in a descending order of the packet numbers.

Moreover, for example, it has been described in the present embodiment that, with regard to an arbitrary Lth packet, a packet number of the Lth packet in a signal block is different from a packet number of the Lth packet in another signal block immediately before the signal block. However, the present disclosure is not limited to this example. It is also possible that a packet number of only the specific Lth packet is different among the signal blocks. For example, it is possible that while a packet number of the first packet is the same among signal blocks B1 to B4, a packet number of the second packet is successively incremented by 1 in signal blocks B1 to B4.

For example, although the shift amount is the same between any adjacent signal blocks in the present embodiment, the present disclosure is not limited to this example. The shift amount may be different among the signal blocks. For example, in the example illustrated in FIG. 12C, a shift amount is two between signal block B1 and signal block B2, while a shift amount is three between signal block B2 and signal block B3.

Furthermore, for example, lighting device 10 may include a communication unit that performs wireless communication in accordance with a wireless communication standard, such as BLE. In this case, lighting device 10 may use BLE to measure a distance from receiver 20 and change signal blocks depending on the measured distance. For example, a length of each packet in a signal block may be changed. More specifically, it is possible to decrease the packet length as the distance becomes longer, and increase the packet length as the distance becomes shorter. In other words, it is possible to increase division number N of identification information 11 as the distance becomes longer, and decrease division number N as the distance becomes shorter.

It is also possible, for example, that lighting device 10 superimposes shortened information, which is generated by shortening identification information 11, onto illumination light and transmits the shortened information as identification information 11. For example, it is possible to set the shortened information to have 16 bits when identification information 11 has 128 bits. This enables receiver 20 to obtain the shortened information in a time period shorter.

In this case, lighting device 10 may transmit identification information 11 through wireless communication. Receiver 20 can obtain identification information 11 corresponding to the shortened information, based on the received shortened information. In this manner, the shortened information helps the obtainment of identification information 11 through wireless communication.

While the foregoing has described what are considered to be the best mode and/or other examples, it is understood that various modifications may be made therein and. that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting device that performs visible light communication with a receiver including an image sensor, the lighting device comprising:
   a dividing unit that divides identification information assigned to the lighting device into N packets, N being a natural number greater than or equal to 2;
   a block generator that generates a plurality of signal blocks each of which includes M packets, M being a natural number greater than or equal to N, and the M packets including at least one of each of the N packets; and a light source that sequentially transmits the plurality of signal blocks in either one of (i) each frame cycle of the image sensor and (ii) each cycle substantially equal to an integral multiple of the frame cycle, by superimposing each of the plurality of signal blocks onto illumination light, wherein the block generator generates the plurality of signal blocks so that an order of arranging the M packets is different between consecutive signal blocks in the plurality of signal blocks.

2. The lighting device according to claim 1, wherein the block generator generates the plurality of signal blocks to have a different Lth packet in each of consecutive N signal blocks in the plurality of signal blocks, L being a natural number in a range from 1 to M, inclusive.

3. The lighting device according to claim 2, wherein L is an arbitrary natural number in a range from 1 to inclusive.

4. The lighting device according to claim 1, wherein each of the N packets is assigned with a value in a range from 1 to N, inclusive, as a unique packet number, and the block generator generates the plurality of signal blocks so that the N packets are repeatedly transmitted in a predetermined order of packet numbers, each of the packet numbers being the unique packet number.

5. The lighting device according to claim 4, wherein the predetermined order is an ascending order of the packet numbers.

6. The lighting device according to claim 4, wherein the packet numbers are sequential in the predetermined order throughout the consecutive signal blocks.

7. The lighting device according to claim 4, wherein a shift amount represents an amount of shift between the packet numbers of adjacent signal blocks in the consecutive signal blocks, the shift amount being either one of (i) a value other than a divisor of N and (ii) a value of 1.

8. A lighting system comprising:

the lighting device according to claim 1; and the receiver.

9. The lighting system according to claim 8, wherein the lighting device further includes an obtainment unit configured to obtain receiving-cycle information indicating a frame cycle of the image sensor, and the light source sequentially transmits the plurality of signal blocks in either one of (i) each frame cycle indicated by the receiving-cycle information obtained by the obtainment unit and (ii) each cycle substantially equal to an integral multiple of the frame cycle.

10. The lighting system according to claim 8, wherein the receiver further includes an obtainment unit configured to obtain transmission-cycle information indicating a transmission cycle of transmitting each of the plurality of signal blocks from the lighting device, and the image sensor operates according to the frame cycle that is either one of (i) the transmission cycle indicated by the transmission-cycle information and (ii) a cycle substantially equal to an integral fraction of the transmission cycle.

* * * * *